US007664981B2

(12) United States Patent
Kim

(10) Patent No.: US 7,664,981 B2
(45) Date of Patent: Feb. 16, 2010

(54) METHOD OF RESTORING SOURCE DATA OF HARD DISK DRIVE AND METHOD OF READING SYSTEM INFORMATION THEREOF

(75) Inventor: Se-hyun Kim, Suwon-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 541 days.

(21) Appl. No.: 11/143,847

(22) Filed: Jun. 3, 2005

(65) Prior Publication Data

US 2006/0020849 A1 Jan. 26, 2006

(30) Foreign Application Priority Data

Jul. 22, 2004 (KR) ............... 10-2004-0057138

(51) Int. Cl.
*G06F 11/14* (2006.01)
(52) U.S. Cl. ............................. 714/5; 714/6; 711/162
(58) Field of Classification Search .............. 714/5, 714/6
See application file for complete search history.

(56) References Cited

U.S. PATENT DOCUMENTS

| 5,566,316 | A | * | 10/1996 | Fechner et al. | ............. 711/114 |
| 6,018,778 | A | * | 1/2000 | Stolowitz | ................ 710/61 |
| 6,065,017 | A | * | 5/2000 | Barker | .................. 707/202 |
| 2002/0032881 | A1 | * | 3/2002 | Ng et al. | ............. 714/5 |
| 2002/0069363 | A1 | * | 6/2002 | Winburn | .............. 713/200 |
| 2004/0128582 | A1 | * | 7/2004 | Chou | .............. 714/5 |
| 2005/0102547 | A1 | * | 5/2005 | Keeton et al. | ............. 714/1 |
| 2005/0289387 | A1 | * | 12/2005 | Hajji et al. | ............. 714/6 |

FOREIGN PATENT DOCUMENTS

| JP | 10222315 A | * | 8/1998 |
| JP | 11-296420 | | 10/1999 |
| JP | 2000-20248 | | 1/2000 |
| JP | 2000293389 A | * | 10/2000 |
| JP | 2000-330731 | | 11/2000 |
| JP | 2001-307410 | | 11/2001 |
| JP | 2002-132559 | | 5/2002 |
| KR | 2003-0070346 | | 8/2003 |

OTHER PUBLICATIONS

"HDD Data Integrity and Performance Enhancement Via Redundant Recording in the Head Load/Unload Zone," Mar. 1, 2001, IBM technical Disclosure Bulletin, UK, TDB-ACC-No. NNRD443155.*
Korean Office Action for Application No. 10-2004-0057138 issued on Dec. 16, 2005.

* cited by examiner

*Primary Examiner*—Scott T Baderman
*Assistant Examiner*—Chae Ko
(74) *Attorney, Agent, or Firm*—Staas & Halsey LLP

(57) ABSTRACT

A method of restoring source data if the source data written in a system region of a hard disk drive and mirror data, which is a copy of the source data, are both damaged, in which the source data is read on a sector basis and error-free sectors and error-generated sectors are determined. The mirror data is read on a sector basis in such a way that sectors corresponding to the error-generated sectors are read. Source data is restored by merging source data read from the error-free sectors and mirror data read from the sectors corresponding to the error-generated sectors.

8 Claims, 5 Drawing Sheets

METHOD OF RESTORING SOURCE DATA OF HARD DISK DRIVE AND METHOD OF READING SYSTEM INFORMATION THEREOF

CROSS-REFERENCE TO RELATED APPLICATIONS

This application claims the priority of Korean Patent Application No. 2004-57138, filed on Jul. 22, 2004, in the Korean Intellectual Property Office, the disclosure of which is incorporated herein by reference.

BACKGROUND OF THE INVENTION

1. Field of the Invention

The present invention relates to a method of managing system information of a hard disk drive, and more particularly, to a method of restoring system information when the system information written in a system region is damaged, and a method of reading system information by using the system information restoring method.

2. Description of the Related Art

A hard disk drive has a plurality of disks and heads, each disk being accessed by its corresponding head.

In a burn-in test of a manufacturing process of a hard disk drive, whether defects exist on a disk is checked. If defects exist on a disk, such a defect region is replaced with a spare region. Information about such replacement, namely a slip list, is written in a system cylinder (hereinafter, referred to as a system region) of the defective disk.

Generated in the burn-in test process, are specific correction values of the hard disk drive, such as a parameter to optimize a write current, a parameter to retry, and a parameter to optimize a read current. These specific correction values are essential information necessary for normal operation of a corresponding hard disk, drive and the specific correction values are stored in a system region of a disk.

Defects may also be generated on a disk while a hard disk drive is used by users. If defects are generated on a disk during use, such a defect region is replaced with a spare region. Information about such replacement, namely a reassign list, is also written in the system region.

System information written in the system region is important for operation and management of the hard disk drive. Therefore, such a system region should be safely protected against the danger of being damaged.

For system information written in a system region to be robust against errors, a method of preserving a copy of the system information is used. In the method, the system region is divided into a source region and a mirror region, and then original system information is written as source data in the source region, and the copied system information is written as mirror data in the mirror region.

FIGS. 1A and 1B illustrate examples of setting a source region and a mirror region in a hard disk drive. FIG. 1A illustrates an example of setting a source region and a mirror region in the same disk, and FIG. 1B illustrates an example of setting a source region and a mirror region in different disks. In FIGS. 1A and 1B, identical system information is stored on a hard disk drive in a source region 102 and a mirror region 104, respectively.

In FIG. 1A, for users convenience, the source data and the mirror data are written in such a way that only track addresses are different but sector addresses are the same for the source data and the mirror data. In FIG. 1B, the source data and the mirror data are written in such a way that only head addresses are different but track and sector addresses are the same for the source data and the mirror data.

When powered on, the hard disk drive 100 performs an initialization operation. In the initialization operation, the hard disk drive 100 accesses the source region 102 of a system region, and reads system information such as slip/reassign lists, read/write parameters, and a retry parameter, and then temporarily stores the read system information in a random access memory (RAM). The system region may be accessed every time the system information is required. But such a method considerably increases delay due to an access time. Therefore, to increase an access speed, the hard disk reads the system information in initialization operation, and then stores the read system information in an RAM (Random Access Memory). While the hard disk drive operates, it uses the system information stored in the RAM. If the system information is changed, such a change in the system information is written in the source region 102 and the mirror region 104.

FIG. 2 is a flowchart illustrating a conventional method of reading system information.

Referring to FIG. 2, if system information is required, a controller accesses the source region 102 and then reads source data (operation S202). The controller checks whether read errors are generated at the time of reading the source data (Operation S204). If it is determined that read errors are not generated in operation S204, the controller loads the read source data into a buffer area of a memory and then ends a read operation (operation 206). If it is determined that read errors are generated in operation S204, the controller accesses the mirror region 104 storing a copy of system information and then reads mirror data. The controller checks whether read errors are generated at the time of reading the mirror data (operation S208). If it is determined that read errors are not generated in operation S208, the controller loads the read mirror data into a buffer area and then ends a read operation (operation 206). If it is determined that read errors are generated in operation S208, the controller performs an error process operation S210. Here, whether read errors are generated is determined in consideration of a retry operation also.

As stated above, the conventional method provides against the danger of generation of errors in the source region 102, by backing up the system information in the mirror region 104.

But a possibility of generation of errors in the mirror region 104 is equivalent to that in the source region 104. In other words, read errors may be generated not only in the source region 102 but also in the mirror region 104. Consequently, the conventional method cannot provide against a case where read errors are generated in both the source region 102 and the mirror region 104.

Errors that may be generated in the system region are due to various causes such as defects (main cause), impurities, disk slip, and TA (Thermal Asperity). Also, the system information may be incorrectly written in the system region, due to an off-track condition.

SUMMARY OF THE INVENTION

The present invention provides a method of restoring source data in case that source data written in a system region of a hard disk drive and mirror data that is a copy of the source data are both damaged.

Also, the present invention provides an improved method of reading system information by using the above source data restoring method.

According to an aspect of the present invention, there is provided a method of restoring source data if the source data written in a system region of a hard disk drive and mirror data which is a copy of the source data are both damaged. The method includes: reading the source data on a sector basis, and then determining error-free sectors and error-generated sectors; reading the mirror data on a sector basis is such a way that sectors corresponding to the error-generated sectors are read; and restoring the source data by merging source data read from the error-free sectors and mirror data read from the sectors corresponding to the error-generated sectors.

According to another aspect of the present invention, there is provided a method of reading system information of a hard disk drive in which source data having system information and mirror data which is a copy of the source data, are written in a system region of the hard disk drive. The method includes: determining whether both the source data and the mirror data have errors; restoring the source data with reference to both the source data and the mirror data, if both the source data and the mirror data have errors; and rewriting the source data and the mirror data in the system region by using the restored source data.

Additional aspects and/or advantages of the invention will be set forth in part in the description which follows, and in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings, of which.

DETAILED DESCRIPTION

Figure 1A:
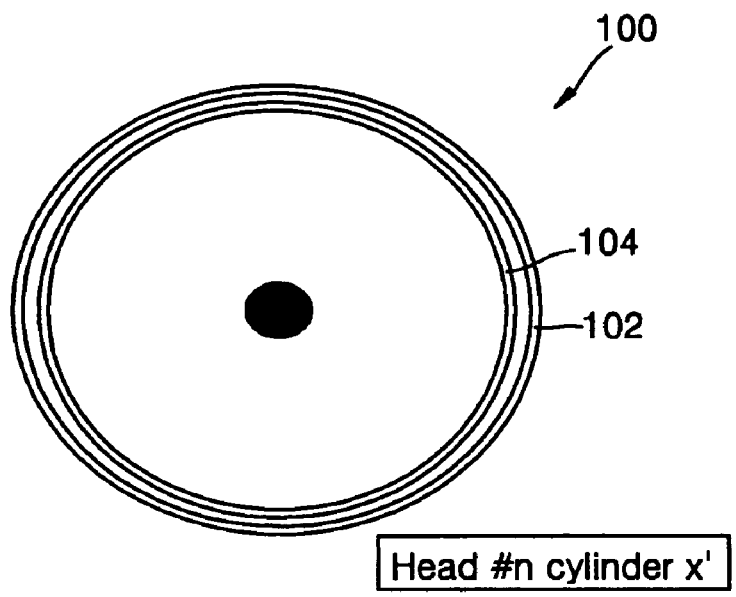
FIGS. 1A and 1B illustrate examples of setting a source region and a mirror region in a hard disk drive.

Reference will now be made in detail to embodiments of the present invention, examples of which are illustrated in the accompanying drawings, wherein like reference numerals refer to the like elements throughout. The embodiments are described to explain the present invention by referring to the figures.

Figure 3:
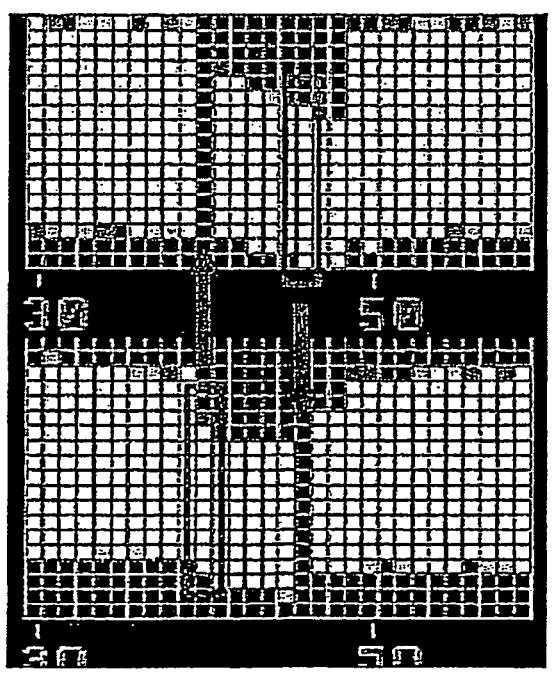
FIG. 3 illustrates a case where defects are generated both in a source region and in a mirror region.

FIG. 3 illustrates a case where defects are generated in both a source region and a mirror region. The upper part of FIG. 3 corresponds to a part of a source region, and the lower part of FIG. 3 corresponds to a part of a mirror region.

In the conventional method of reading system information, the procedure for reading system information is normally terminated only when both source data and mirror data are not damaged. Even though all the sectors except ones on both of source data and mirror data (as shown in FIG. 3) are normal, the conventional procedure for reading system information is error processed.

A method of restoring original source data in case that source data and mirror data are damaged, is as follows:

1. In a case where source data is damaged and mirror data is normal:
   source data is restored by the normal mirror data.
2. In a case where source data and mirror data are both damaged and the damaged part of the source data is different from that of the mirror data:
   source data and the mirror data are read on a sector basis, and valid data is
   extracted from the read data, and whole data is restored by the valid data, and
   then source data and mirror data are rewritten by using the restored data.

Figure 4:
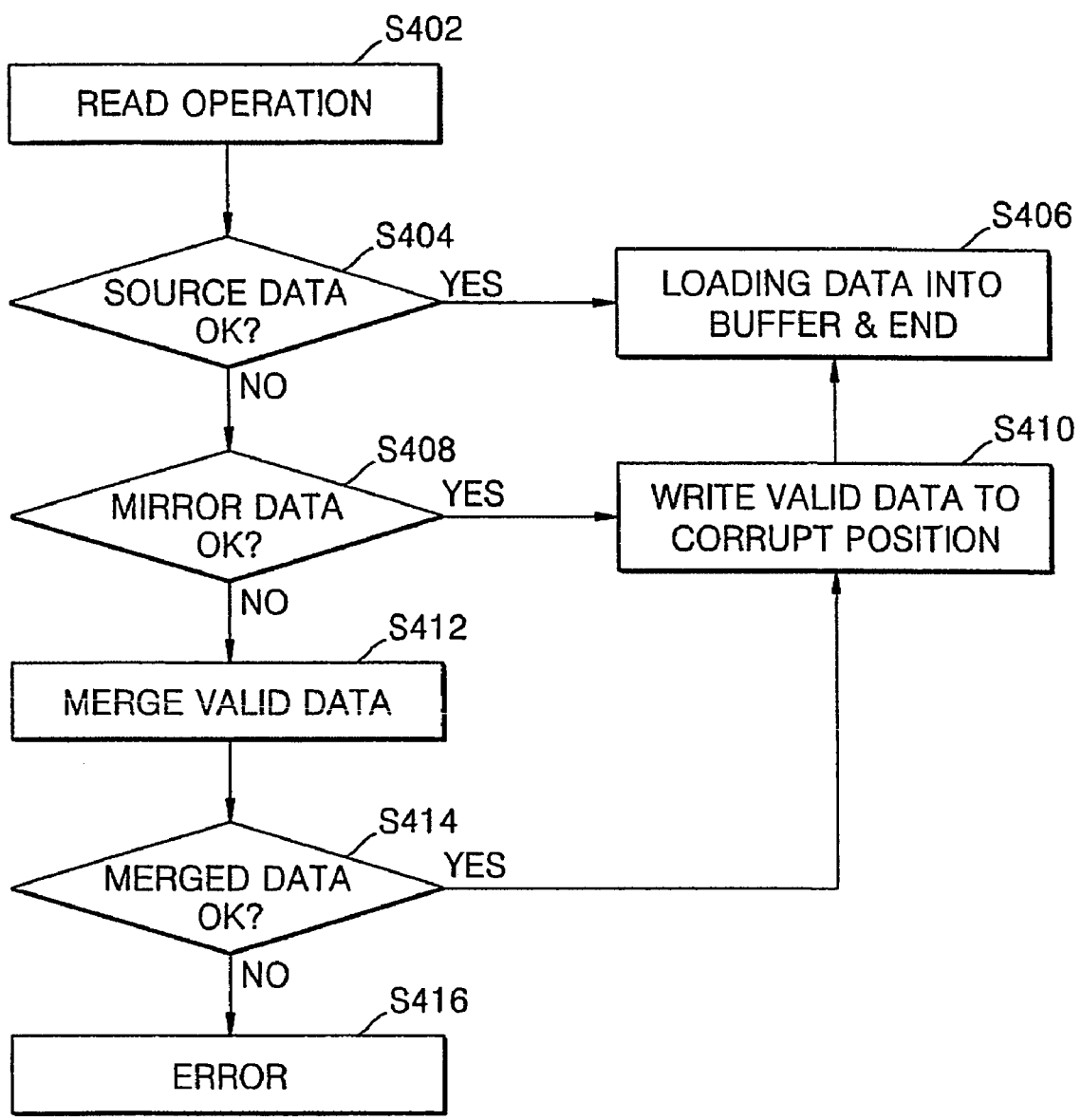
FIG. 4 is a flowchart illustrating a method of reading system information according to an embodiment of the present invention.

FIG. 4 is a flowchart illustrating a method of reading system information according to an embodiment of the present invention.

Referring to FIG. 4, if system information is required, a controller accesses the source region 102 and then reads source data (operation S402). The controller checks whether read errors are generated at the time of reading the source data (operation S404). If it is determined that read errors are not generated in operation S404, the controller loads the read source data into a buffer area of a memory and then ends a read operation (operation 406). If the source data is written in n sectors, the source data may be read on a sector basis, or n sectors storing the source data may be read at a time. In both cases, if at least one of n sectors has errors, a read error occurs. If it is determined that read errors are generated in operation S404, the controller accesses the mirror region 104 and then reads mirror data. The controller checks whether read errors are generated at the time of reading the mirror data (operation S408). If it is determined that read errors are not generated in operation S408, the controller rewrites the source data using the mirror data, and loads the read mirror data into a buffer area and then ends a read operation (operation S406). If it is determined that read errors are generated in operation S408, the controller restores the original source data by reading both the source data and the mirror data (operation S412).

Figure 5:
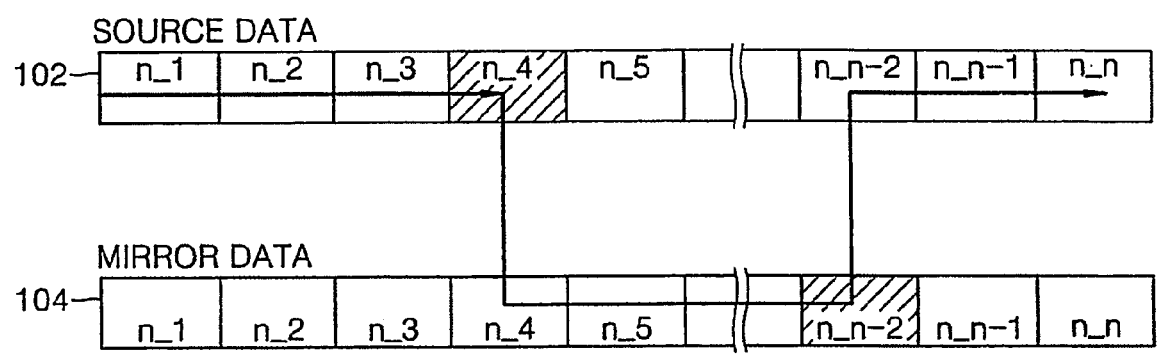
FIG. 5 is a diagram illustrating a method of restoring source data according to an embodiment of the present invention.

FIG. 5 is a diagram illustrating a method of restoring source data according to an embodiment of the present invention.

Referring to FIG. 5, firstly, a controller reads source data from the source region 102 on a sector basis. If the controller encounters an error-having sector in the course of sequentially reading sectors writing the source data therein, the controller moves to corresponding sectors of the mirror region 104 and then reads the mirror data from the corresponding sectors of the mirror region 104. On the contrary, if the controller encounters an error-having sector in the course of reading the mirror data from the mirror region 104, the controller moves to corresponding sectors of the source region 102 and then reads the source data from the corresponding sectors of the source region 102.

Figure 1B:
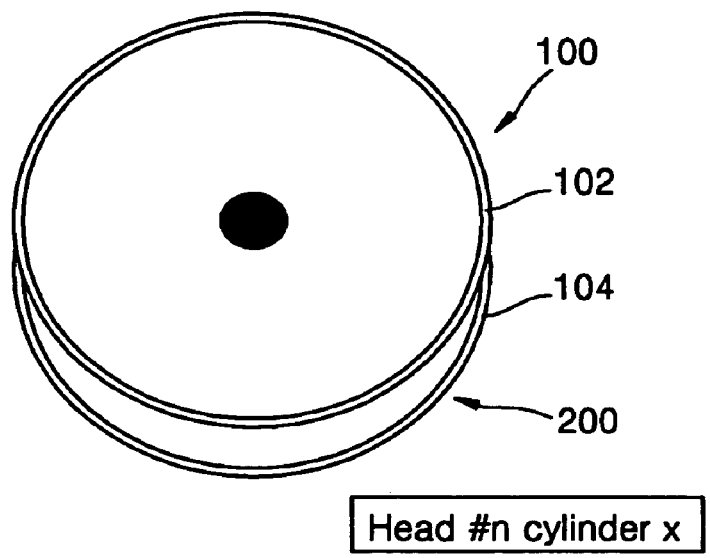
Figure 2:
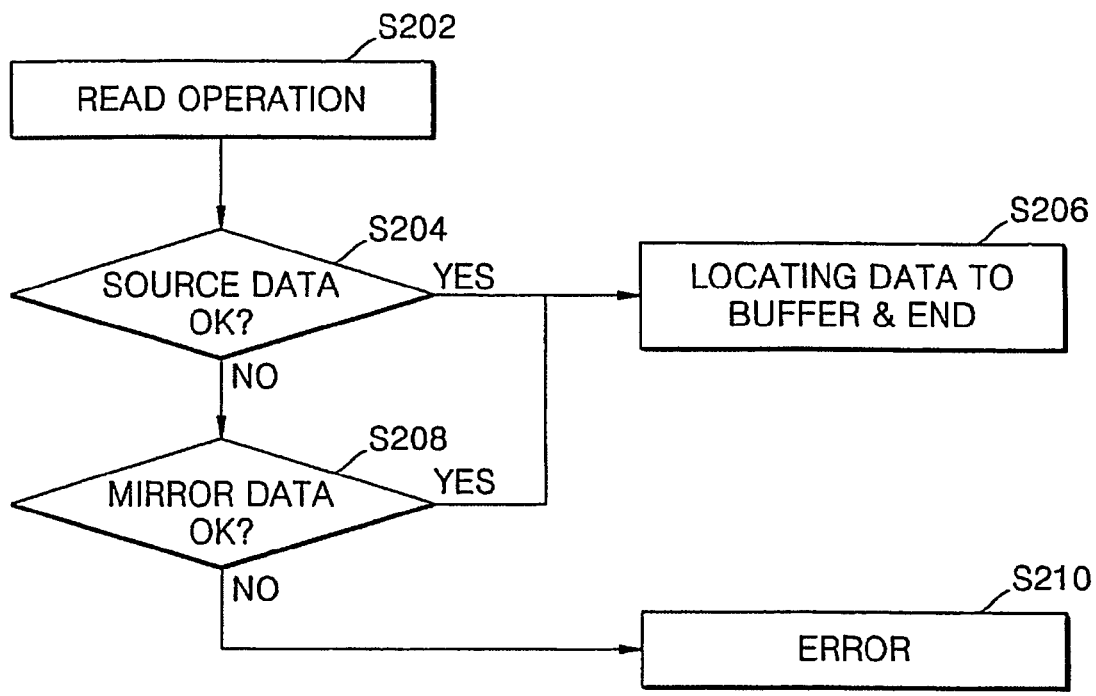
FIG. 2 is a flowchart illustrating a conventional method of reading system information.

As stated above, only track addresses are different (See FIG. 1A) or only head addresses are different (See FIG. 1B) for the source data and the mirror data. Therefore, when the controller encounters an error-having sector in the course of reading the source data or the mirror data on a sector basis, the controller moves to another corresponding sector and then tries to read valid system information by changing only a track address or only a head address, and thereby makes it possible to restore the source data.

Figure 6:
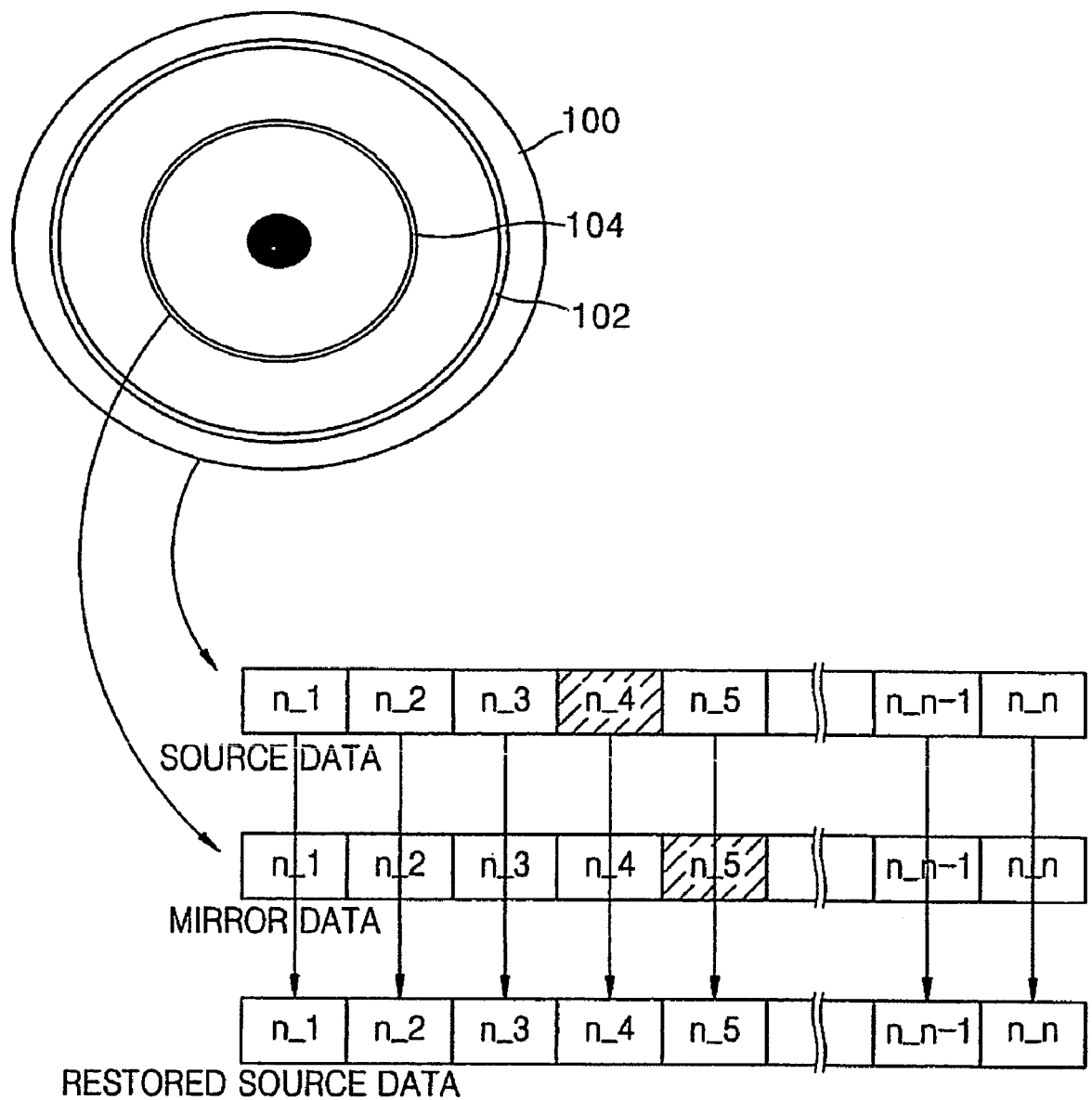
FIG. 6 is a diagram illustrating another method of restoring source data according to another embodiment of the present invention.

FIG. 6 is a diagram illustrating another method of restoring source data according to another embodiment of the present invention.

Referring to FIG. 6, firstly, the controller reads the source data on a sector basis and then writes only error-free sectors in a buffer. Next, the controller reads the mirror data on a sector basis and then writes only error-free sectors in the buffer. The controller extracts the source data and the mirror written in the buffer, on a sector basis, in such a way that logical sector addresses are not repeated, and then outputs the extracted data as restored source data.

Referring to FIG. 4, the controller checks whether the restored source data is complete (operation S414). That is, the controller checks whether logical addresses of sectors constituting the restored source data is complete. If the restored source data is determined to be complete in operation S414, the controller rewrites the source data and the mirror data in the system region by using the restored source data (operation S410), and loads the restored source data into the buffer and then ends a read operation (operation S406).

A case where the source data or the mirror data cannot be written at its original write position due to errors generated in the system region, may arise. In this case, the restored source data is firstly loaded into an RAM so that the restored source data may be used until the hard disk drive is powered off. Next, the system region is reset, and then the source data and the mirror data is written in the reset system region. Here, boot information indicating the system region may be stored in a read-only memory (ROM) or in the system region. If boot information was stored in an ROM, reset boot information is rewritten in the ROM. If boot information was stored in a system region, reset boot information is written in the system region.

If the restored source data is determined to be incomplete in operation S414, the controller performs an error process (operation S416) and then ends a read operation. In general, the error process is outputting a disk fail message indicating that a disk was not ready for use.

As stated above, the system information restoring method according to the present invention makes it possible to restore source data by merging damaged source data and damaged mirror data if the source data and mirror data written in a system region are both damaged, thereby increasing robustness against errors in the system information.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of restoring source data if the source data if the source data, written in a source region of a system region of a hard disk drive, and mirror data that is a copy of the source data and that is written in a mirror region of the system region, are both damaged, the method comprising:
   reading the source data on a sector basis and determining error-free sectors and error-generated sectors;
   reading the mirror data on a sector basis in such a way that sectors corresponding to the error-generated sectors are read;
   resetting a position of the source region and the mirror region when the source data and the mirror data cannot be rewritten at respective original write positions due to damage of the system region; and
   restoring source data in a disk drive by merging source data read from the error-free sectors and mirror data read from the sectors corresponding to the error-generated sectors and rewriting the merged data to the reset source region and to the reset mirror region.

2. The method of claim 1, further comprising storing the restored source data in RAM (Random Access Memory) so that the restored source data can be used until the hard disk drive is powered off, if the source data or the mirror data cannot be rewritten at respective original write positions due to damage of the system region.

3. A method of reading system information of a hard disk drive in which source data having system information, is written in a source region of the hard disk drive, and mirror data, which is a duplicate copy of the source data, is written in a mirror region of the hard disk drive, the method comprising:
   determining whether both the source data and the mirror data have errors;
   resetting a position of the source region and the mirror region when the source data and the mirror data cannot be rewritten at respective original write positions due to damage;
   restoring the source data with reference to both the source data and the mirror data, if both the source data and the mirror data have errors; and
   rewriting the source data in the reset source region and the mirror data in the reset mirror region using the restored source data.

4. The method of claim 3, wherein the restoring the source data comprises:
   reading the source data on a sector basis, and then determining error-free sectors and error-generated sectors;
   reading the mirror data on a sector basis, wherein sectors corresponding to the error-generated sectors are read; and
   restoring the source data by merging source data read from the error-free sectors and mirror data read from the sectors corresponding to the error-generated sectors.

5. The method of claim 4, further comprising storing the restored source data in RAM (Random Access Memory) so that the restored source data can be used until the hard disk drive is powered off, if the source data or the mirror data cannot be rewritten at respective original write positions due to damage of the system region.

6. A method of reading system information from a system region of a hard disk drive, the method comprising:
   reading source data from a source region of the system region;
   determining whether an error is generated during the reading of the source data;
   if an error is generated during the reading of the source data, reading mirror data that corresponds to a sector of source data in which the error was generated, the mirror data being a copy of the source data and being written in a mirror region of the system region;
   determining whether an error is generated during the reading of the mirror data;
   combining the source data and the mirror data;
   if an error is generated during the reading of the mirror data, determining whether logical addresses of sectors of the combined data are complete;
   resetting a position of the source region and the mirror region when the combined data cannot be rewritten at respective original write positions due to damage of the system region; and
   if the logical addresses of sectors of the combined data are complete, or if no error is generated during the reading of the mirror data, writing the combined data to the reset source region and to the reset mirror region, and loading the combined data into a memory buffer.

7. A method of restoring system information from a system region of a hard disk drive having a source region and a mirror region in which source data from the source region is copied as mirror data and written in the mirror region, the method comprising:

reading source data until a sector with invalid data is encountered;

when reading data in any one of the source region or the mirror region, if a sector with an error is encountered, switching a controller to read data from a sector in the remaining one of the source region or the mirror region corresponding to the sector with an error by changing only a track address or only a head address, until all of the system information has been read;

resetting a position of the source region and the mirror region when the source data and the mirror data cannot be rewritten at respective original write positions due to damage of the system region; and restoring source data in the hard disk drive by combining the read data and rewriting the source data to the reset source region and the mirror data to the reset mirror region using the combined read data.

8. A method of restoring system information from a system region of a hard disk drive having a source region and a mirror region in which source data from the source region is copied as mirror data, the method comprising:

reading the source data on a sector basis and then writing only error-free sectors in a buffer;

reading the mirror data on a sector basis and writing only error-free sectors in the buffer;

extracting the source data and the mirror written in the buffer, on a sector basis, such that logical sector addresses are not repeated;

resetting a position of the source region and the mirror region when the extracted source data and the mirror data cannot be rewritten at respective original write positions due to damage of the system region; and restoring source data in the hard disk drive by merging the extracted source data read from the error-free sectors and the extracted mirror data read from the error-free sectors and rewriting the source data in the reset source region and the mirror data in the reset mirror region.

* * * * *

UNITED STATES PATENT AND TRADEMARK OFFICE
CERTIFICATE OF CORRECTION

PATENT NO. : 7,664,981 B2  Page 1 of 1
APPLICATION NO. : 11/143847
DATED : February 16, 2010
INVENTOR(S) : Se-hyun Kim It is certified that error appears in the above-identified patent and that said Letters Patent is hereby corrected as shown below:

Column 5, Line 46, change "A method of restoring source data if the source data if the" to --A method of restoring source data if the--.

Signed and Sealed this

Eighteenth Day of May, 2010

David J. Kappos
*Director of the United States Patent and Trademark Office*